United States Patent
Park et al.

(10) Patent No.: US 8,826,167 B2
(45) Date of Patent: Sep. 2, 2014

(54) LETTER INPUT METHOD AND APPARATUS OF PORTABLE TERMINAL

(75) Inventors: Dong Joon Park, Gumi-si (KR); Bum Soo Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/155,760

(22) Filed: Jun. 8, 2011

(65) Prior Publication Data

US 2011/0307822 A1 Dec. 15, 2011

(30) Foreign Application Priority Data

Jun. 10, 2010 (KR) ........................ 10-2010-0054699

(51) Int. Cl.
| | | |
|---|---|---|
| *G06F 3/048* | (2013.01) | |
| *G09G 5/00* | (2006.01) | |
| *G06F 3/041* | (2006.01) | |
| *G06T 11/00* | (2006.01) | |

(52) U.S. Cl.
USPC ........... 715/773; 715/825; 715/840; 345/156; 345/173; 345/467

(58) Field of Classification Search
USPC .......................... 715/773, 771, 825, 837, 840; 345/156–184, 467
See application file for complete search history.

(56) References Cited

U.S. PATENT DOCUMENTS

| | | | |
|---|---|---|---|
| 6,307,548 B1 | 10/2001 | Flinchem et al. | |
| 8,125,463 B2 * | 2/2012 | Hotelling et al. | 345/173 |
| 8,207,943 B2 * | 6/2012 | Park et al. | 345/171 |
| 8,225,203 B2 * | 7/2012 | Unruh | 715/255 |
| 8,232,973 B2 * | 7/2012 | Kocienda et al. | 345/173 |
| 2004/0125152 A1 * | 7/2004 | Sommers et al. | 345/856 |
| 2008/0316183 A1 * | 12/2008 | Westerman et al. | 345/173 |
| 2009/0282332 A1 * | 11/2009 | Porat | 715/702 |
| 2009/0284495 A1 * | 11/2009 | Geaghan et al. | 345/174 |
| 2010/0231523 A1 * | 9/2010 | Chou | 345/171 |
| 2010/0321302 A1 * | 12/2010 | Nanda et al. | 345/171 |
| 2011/0099505 A1 * | 4/2011 | Dahl | 715/773 |
| 2011/0175816 A1 * | 7/2011 | Shin | 345/168 |
| 2011/0258565 A1 * | 10/2011 | Arscott et al. | 715/763 |

FOREIGN PATENT DOCUMENTS

| | | |
|---|---|---|
| KR | 10-2008-0078284 A | 8/2008 |
| KR | 10-2009-0132443 A | 12/2009 |

* cited by examiner

*Primary Examiner* — Doon Chow
*Assistant Examiner* — Shourjo Dasgupta
(74) *Attorney, Agent, or Firm* — Jefferson IP Law, LLP (57) ABSTRACT

A text input method and apparatus of a portable terminal supporting a virtual keypad including a plurality of character keys are provided. The method includes displaying, when a text input mode is activated, a virtual keypad including a plurality of key regions, each key region being assigned plural letters, compounding, when a touch movement event is detected on the virtual keypad, letters assigned to a first key region to which a touch-down event is made with letters assigned to a second key region to which a touch-up event is made into compound letters, displaying the compound letters, and inputting, when a compound letter is selected, the compound letter selected.

20 Claims, 7 Drawing Sheets

LETTER INPUT METHOD AND APPARATUS OF PORTABLE TERMINAL

PRIORITY

This application claims the benefit under 35 U.S.C. §119(a) of a Korean patent application filed on Jun. 10, 2010 in the Korean Intellectual Property Office and assigned Ser. No. 10-2010-0054699, the entire disclosure of which is hereby incorporated by reference.

BACKGROUND OF THE INVENTION

1. Field of the Invention

The present invention relates to a portable terminal. More particularly, the present invention relates to a letter input method and apparatus of the portable terminal supporting a virtual keypad having a plurality of character keys.

2. Description of the Related Art

With the advance of data communication and semiconductor technologies, the use of portable terminals is widespread and the number of users is increasing rapidly. Recently, the portable terminals are evolving into multifunctional devices integrating various functions in line with the mobile convergence tendency. As a representative case, a recent mobile communication terminal integrates various multimedia functions including a Television (TV) function such as Digital Multimedia Broadcasting (DMB) and Digital Video Broadcasting (DVB), a music player function (e.g., Motion Picture Experts Group (MPEG) Audio Layer-3 (MP3)), a camera function, an Internet function, and an electronic dictionary function, as well as conventional communication functions such as voice and message communication.

Recently developed portable terminals are being equipped with a touchscreen due largely to its input convenience. Typically, touchscreen-enabled portable terminals are not provided with a 3×4 button keypad of the related art. The keypad is provided instead on the touchscreen display of the portable terminal in the form of a virtual keypad. However, due to the space-constrained display, each key is assigned multiple letters (e.g., 3 letters) that are selected according to a number of input touches made thereon. For example, if a touch is made on the key assigned the three letters of 'a,' 'b,' and 'c', the letter 'a' is first displayed on the screen, and when the touch is made repeatedly, the displayed letter changes to 'b' and then 'c'. Accordingly, in order to input the letter 'c', the user must touch the key at least three times in a brief time period. That is, the letter input method of the related art of a 3×4 button keypad has a drawback in that multiple touches must be made to a key to input a letter. Particularly, when the user inputs a series of letters that each require multiple touches, the total number of touches required increases severalfold, resulting in user inconvenience.

SUMMARY OF THE INVENTION

Aspects of the present invention are to address at least the above-mentioned problems and/or disadvantages and to provide at least the advantages described below. Accordingly, an aspect of the present invention is to provide a letter input method and apparatus of a portable terminal equipped with a touchscreen supporting a virtual keypad having key regions each assigned multiple letters that is capable of facilitating improved text input.

In accordance with an aspect of the present invention, a text input method of a portable terminal is provided. The method includes displaying, when a text input mode is activated, a virtual keypad including a plurality of key regions, each key region being assigned plural letters, compounding, when a touch movement event is detected on the virtual keypad, letters assigned to a first key region to which a touch-down event is made with letters assigned to a second key region to which a touch-up event is made into compound letters, displaying the compound letters, and inputting, when a compound letter is selected, the compound letter selected.

In accordance with another aspect of the present invention, a text input apparatus of a portable terminal is provided. The apparatus includes a display unit for displaying, when a text input mode is activated, a virtual keypad including a plurality of key regions, each key region being assigned plural letters, a touch sensing unit for detecting a touch event on the virtual keypad, and a control unit for compounding, when a touch movement event is detected on the virtual keypad, letters assigned to a first key region to which a touch-down event is made with letters assigned to a second key region to which a touch-up event is made into compound letters, for displaying the compound letters on the display unit, and for presenting, when a compound letter is selected, the compound letter in a text presentation region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the exemplary embodiments of the present invention described herein, the portable terminal is equipped with a touchscreen providing a virtual keypad with which the user can input text and may be any of a Personal Digital Assistant (PDA), a Smartphone, a Portable Multimedia Player (PMP), and their equivalents. The description is directed to an exemplary portable communication terminal.

Figure 1:
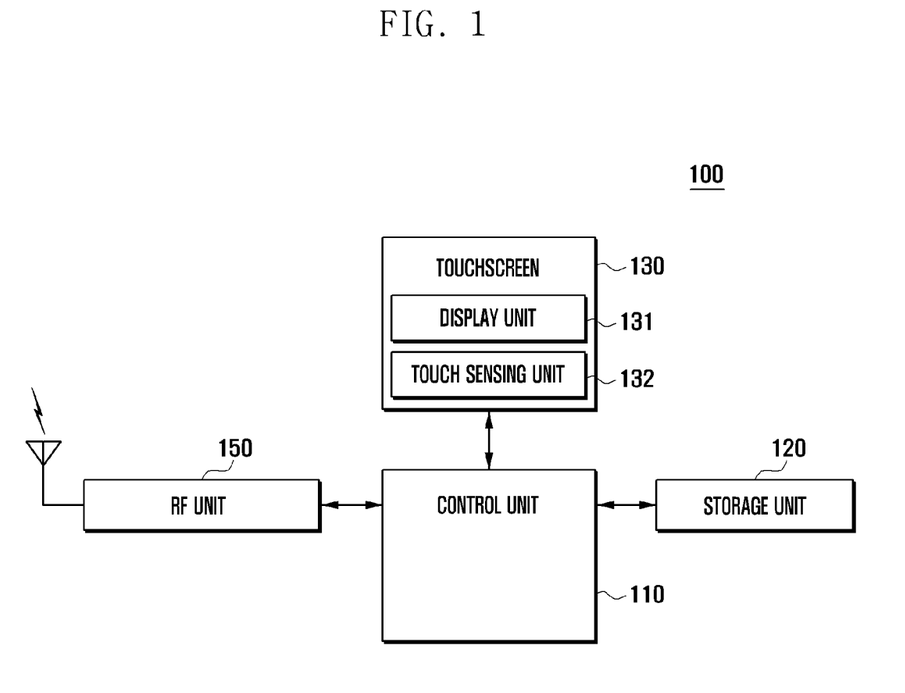
FIG. 1 is a block diagram illustrating a configuration of a portable terminal according to an exemplary embodiment of the present invention.

FIG. 1 is a block diagram illustrating a configuration of a portable terminal according to an exemplary embodiment of the present invention.

Referring to FIG. 1, the portable terminal 100 includes a control unit 110, a storage unit 120, a touchscreen 130, and a Radio Frequency (RF) unit 150. The touchscreen 130 can include a display unit 131 and a touch sensing unit 132.

The RF unit 150 is responsible for establishing communication channels for voice and data communications under the control of the control unit 110. That is, the RF unit 150 establishes a voice communication channel, a data communication channel, or a video communication channel with a base station of a mobile communication system. The RF unit 150 can process radio signals carrying text and email data. For this purpose, the RF unit 150 can include an RF transmitter (not shown) for up-converting and amplifying a transmit signal frequency and an RF receiver (not shown) for low noise amplifying and down-converting a received signal frequency.

The touchscreen 130 is an input/output device supporting information display and receiving user input, and can include the display unit 131 and the touch sensing unit 132.

The display unit 131 displays information input by and provided to the user, as well as various menus. That is, the display unit 131 displays various screens associated with operations of the portable terminal 100 such as a standby screen, a menu screen, and a call progress screen. More particularly, in an exemplary embodiment of the present invention, when the portable terminal 100 operates in a text input mode, the display unit 131 displays a text message composition screen for supporting text input. The text message composition screen can include a text presentation region for presenting letters input by the user, a menu region providing menu items executable in the text input mode, and a virtual keypad region presenting a virtual keypad. The text message composition screen is described in more detail with reference to exemplary screen images. The display unit 131 may be implemented with one of a Liquid Crystal Display (LCD), an Organic Light Emitting Diode (OLED), and an Active Matrix OLED (AMOLED).

The touch sensing unit 132 may be formed to cover a surface of the display unit 131 so as to detect a touch made on the surface of the touchscreen 130. Here, the touch can be made by a touch input tool, such as a stylus, or a part of human body, such as a finger. When a contact of the finger or the touch input tool is made on the touchscreen 130, the touch sensing unit 132 determines coordinates of a position where the contact is detected on the touchscreen 130 and sends the coordinates to the control unit 110. The touch sensing unit 132 may be implemented with a touch sensing technology such as a capacitive overlay method, a resistive overlay method, or an infrared beam method.

The storage unit 120 may store an Operating System (OS), application programs necessary for supplementary functions such as a sound playback function and a still and motion picture playback function, and user data and communication data. In an exemplary embodiment of the present invention, the storage unit 120 may store a letter compound program for compounding letters assigned for a touch-down event and letters assigned for a touch-up event when a touch movement event occurs in the text input mode. The letter compound program may generate a compound letter created by placing the letters assigned to a key to which the touch-down event is made first. This is because, if too many compound letters are generated, it becomes difficult for the user to find the desired letters. For example, assuming that the key to which the touch-down event is made is assigned three letters and the key to which the touch-up event is made is assigned three letters, the letter compound program may generate nine compound letters. In a case where it is permitted to place the letters assigned to the key to which the touch-up event is made first, the total number of compound letters becomes 18. In a case that too many compound letters are generated, it may take too long time for the user to find the desired compound letters.

When a double touch event, i.e., a touch made twice in series, is made to a specific key, the letter compound program also may compound the letters assigned to the key to which the double touch is made. The storage unit 120 can store a word completion program for showing words registered previously in association with the input letters or used frequently by the user.

The control unit 110 controls the general operations of the portable terminal 100 and the signaling among the internal function blocks of the portable terminal 100. In an exemplary embodiment of the present invention, the control unit 110 can control such that a virtual keypad, having a plurality of keys which are individually assigned plural letters, is displayed in the text input mode to enable the user to input a letter. The control unit 110 can discriminate among a single touch event, a touch movement event, a double touch event, and a multi-touch event. The single touch event is an event in which a contact is made and then released at a position. That is, the single touch event means that a touch-down event and a touch-up event occur at the same position. The touch-down event means an event in which touch contact is made with the touchscreen 130, and the touch-up event means an event in which the touch is released from the touchscreen 130.

The touch movement event means an event in which a touch contact is made at a first position, moved without releasing contact, and then released at another position. The double touch event means an event in which the contact is made twice at a same position (or region) in series, that is, within a predetermined time period. The multi-touch event means an event in which touch contact is made at more than one position simultaneously on the touchscreen 130. The multi-touch event may include a simultaneous multi-touch in which the contacts are made simultaneously, and a sequential multi-touch in which the contacts are made in series at different positions. That is, in the sequential multi-touch, a first touch contact is made at a first position, and while the first contact is maintained, a second touch contact is made at another position. In the exemplary embodiments of the present invention described below, it is preferred to use the sequential multi-touch. This is to reduce a number of compound letters proposed in response to a multi-touch event so as to facilitate finding a desired letter.

The control unit 110 may control in a same manner as a letter input method of the related art such that, when a touch event is made at a key region in the virtual keypad, a first letter assigned to the key region to which the touch event is made is displayed and then, if another touch event is made at the same key region within a predetermined time, the first letter is replaced by the next letter assigned to the key. After the display of a last letter assigned to the key region, if another touch event is made at the same key region again, the displayed letter is replaced by the first letter. The control unit 110 confirms the input of the displayed letter when a navigation key is input, when a touch event is detected at another key region, or when the predetermined time expires. When using the touch-based letter input method of the related art, it is necessary to discriminate the double-touch event, to be described later, from the touch event made sequentially to input the next letter assigned to a specific key region (hereinafter, called sequential touch). For this purpose, a reference time for discriminating between the double touch and the sequential touch can be stored in the storage unit 120. That is, when the second touch event is detected within the reference time after the detection of the first touch event, the control unit 110 determines that the double touch event is input, and otherwise that the sequential touch event is input. The determination condition may be reversed. The reference time can be set to a value less than a value set for confirming the input.

When a touch event is detected on the virtual keypad, the control unit 110 may control such that an auxiliary keypad is presented to present the letters assigned to the key region. The user may select one of the letters presented on the auxiliary keypad.

When a double touch is made on the virtual keypad, the control unit 110 may create compound letters by compounding letters assigned to the key region to which the double touch is made. For example, when a double touch is made to a key region to which the letters 'a,' 'b,' and 'c' are assigned, the control unit 110 controls such that the letters 'a,' 'b,' and 'c' are presented along with 9 compound letters 'aa,' 'ab,' 'ac,' 'ba,' 'bb,' 'bc,' 'ca,' 'cb,' and 'cc' created by compounding the three letters 'a,' 'b,' and 'c'. At this time, the compound letters may be presented in a separate compound letter keypad. The control unit 110 may also control such that the letters on the virtual keypad are replaced by the compound letters. A more detailed description of the compound letter presentation is made later with reference to FIGS. 5 and 6.

The user may select one of the compound letters presented on the compound letter keypad or on the virtual keypad to input. In the letter input method according to an exemplary embodiment of the present invention, in order to input a series of the same letter, e.g., 'bb,' assigned to a key region, the user makes a double touch to the key region assigned the letters 'a,' 'b,' and 'c', and selects the compound letter 'bb' from the compound letter keypad, whereby the two letters are input in two steps. When using the input method of the related art, in order to input 'bb', it is required to touch the key region assigned the letters 'a,' 'b,' and 'c', wait for a predetermined time, move the cursor by means of a navigation key, and touch the key region assigned the 'a,' 'b,' and 'c' twice. In a case of a touch movement event (hereinafter, called return touch movement event) in which a touch-up event occurs at the same position where the touch-down event has occurred, i.e. the touch-up event following the touch movement event occurs at the key region where the initial touch-down event is detected, the control unit 110 may create the compound letters by compounding the letters assigned to the key region to which the touch-down event is made as in a double touch event. For example, when the touch-down is made at the key region assigned the letters 'a,' 'b,' and 'c'; and the touch input tool or the finger moves to another key region, returns to the key region assigned the letters 'a,' 'b,' and 'c', and the touch is released, the control unit 110 can present the letters 'a,' 'b,' and 'c' along with the compound letters created by compounding the letters 'a,' 'b,' and 'c' as if the double touch has been made. In another exemplary case, when a long touch-down event is detected in which the touch-down state is maintained over a predetermined time at a specific key region, the control unit 110 may compound the letters assigned to the specific key region into the compound letters.

In a case that a touch movement event is made on the virtual keypad, the control unit 110 may compound letters assigned to the key region to which the touch-down event is made and letters assigned to the key region to which the touch-up event is made into compound letters and control such that the compound letters are displayed on the screen by means of the display unit 131. For example, when the touch movement event is made from a key region assigned the letters 'd,' 'e,' and 'f' to a key region assigned the letters 'j,' 'k,' and 'l'; the control unit 110 may compound the letters into 9 compound letters 'dj,' 'dk,' 'dl,' 'ej,' 'ek,' 'el,' 'fj,' 'fk,' and 'fl.' In this manner, if the touch moves from a key region having a desired letter to another key region having the next desired letter, the compound letters created by compounding the letters assigned to the two key regions are presented such that the user can input the two desired letters quickly and efficiently by selecting the compound letter comprising the two sequential desired letters.

For example, assuming a case of inputting a series of letters 'fl', the two letters can be efficiently input by making a touch movement event from a key region assigned the letters 'd,' 'e,' and 'f' to a key region assigned the letters 'j,' 'k,' and 'l', and selecting the compound letter 'fl' among a plurality of presented compound letters determined by compounding the set of letter 'd,' 'e,' and 'f' with the set of letters 'j,' 'k,' and 'l'. If the method of the related art is used, the user must touch three times each to the key region assigned the letters 'd,' 'e,' and 'f' and the key region assigned the letters 'j,' 'k,' and 'l'.

The touch movement event-based letter input method of an exemplary embodiment of the present invention may be applied with the multi-touch. For example, if the user makes a sequential multi-touch event in which the second touch-down event is made at a second key region while the first touch-down event is maintained at a first key region, the control unit 110 compounds a set of letters assigned to the first key region with a set of the letters assigned to the second key region into a plurality of compound letters and presents the compound letters on a compound letter keypad such that the user may select the desired compound letter. At this time, the control unit 110 may control such that each of the compound letters starts with one of the letters assigned to the first key region. Since the steps following the compound letter input are identical with those of the touch movement event-based letter input method, a detailed description thereof is omitted herein.

Once the letters are input by the user, the control unit 110 may present the candidate matching words from a database based on the previous input history or by retrieving frequently used words. The candidate words may be presented below the letters input by the user in the text display region. In a case that the desired word is among the candidate words, the user can touch the desired word, resulting in a shortening of the text input time.

Although not depicted in FIG. 1, the portable terminal 100 may further include a Global Positioning System (GPS) module for receiving location information, a broadcast receiver module for receiving broadcast signals, a digital audio playback module such as a Motion Picture Experts Group (MPEG) Audio Layer-3 (MP3) module, or an Internet access module for supporting Internet access. Although all the components now available in the digital convergence tendency are not enumerated herein, the portable terminal 100 according to an exemplary embodiment of the present invention may include at least one of the equivalents of the aforementioned components.

Figure 2:
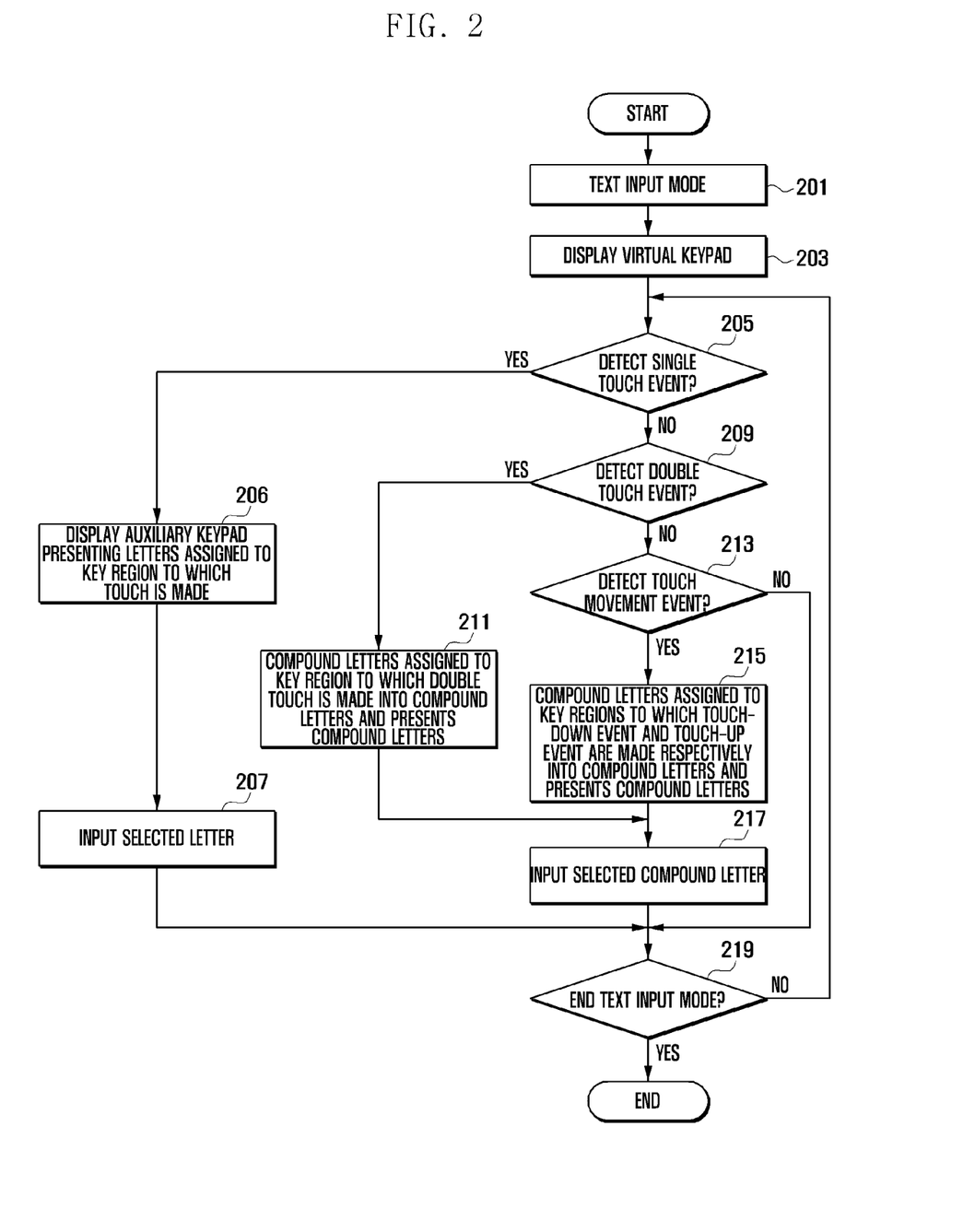
FIG. 2 is a flowchart illustrating a letter input method of a portable terminal according to an exemplary embodiment of the present invention.
Figure 3:
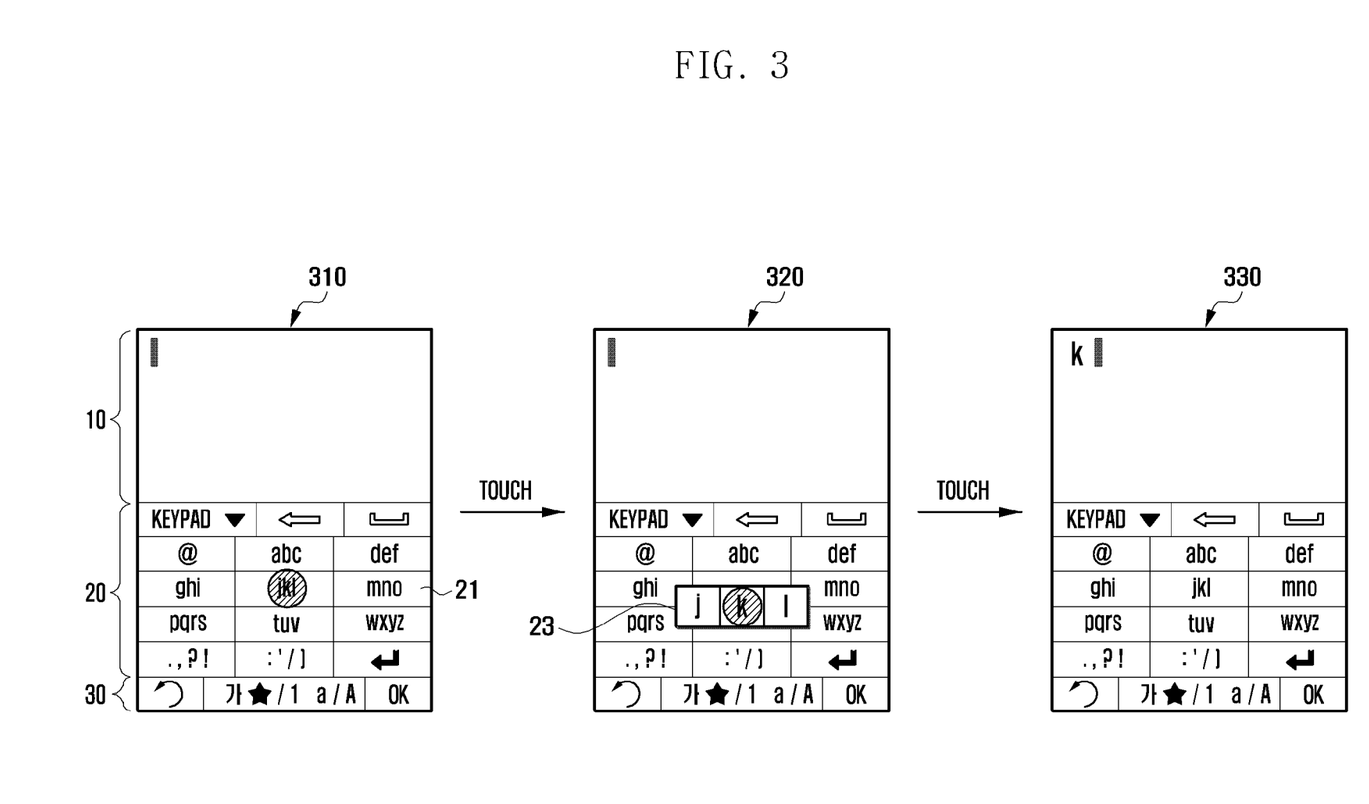
FIGS. 3 and 4 are diagrams illustrating exemplary screen images showing steps of a touch event-based letter input procedure of the letter input method of FIG. 1 according to an exemplary embodiment of the present invention.
Figure 4:
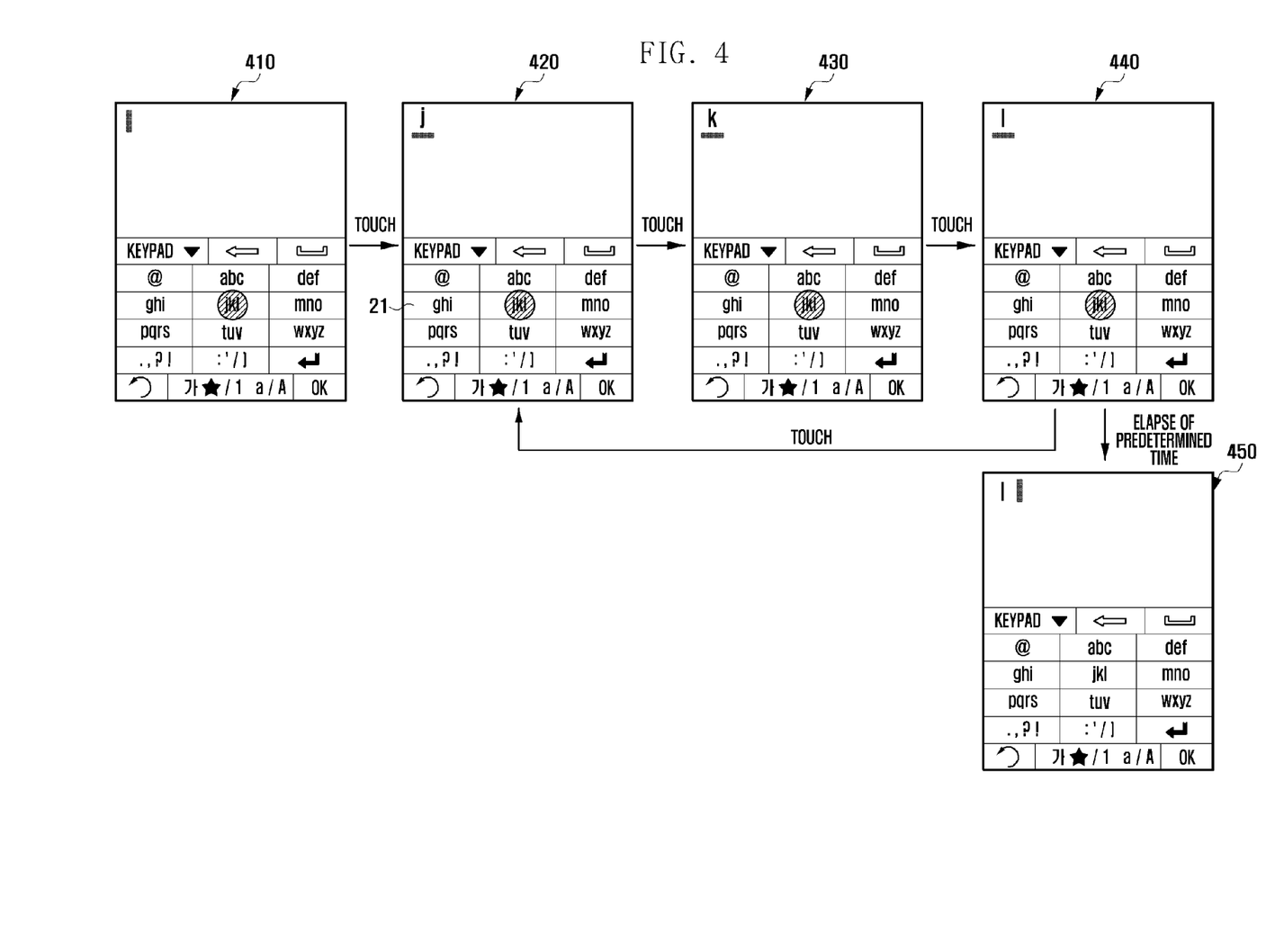
Figure 5:
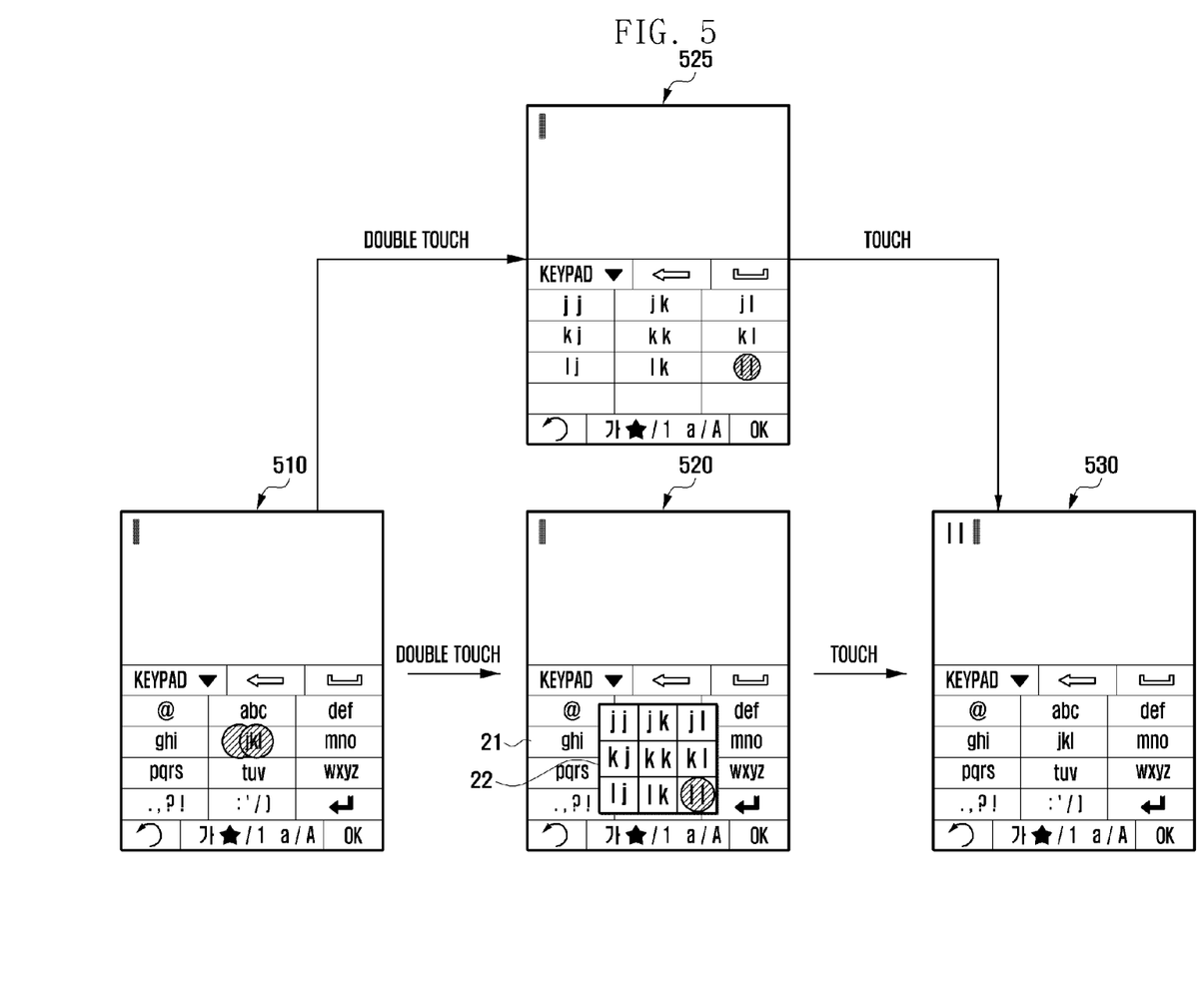
FIG. 5 is a diagram illustrating screen images showing steps of a double touch event-based letter input procedure of the letter input method of FIG. 1 according to an exemplary embodiment of the present invention.
Figure 6:
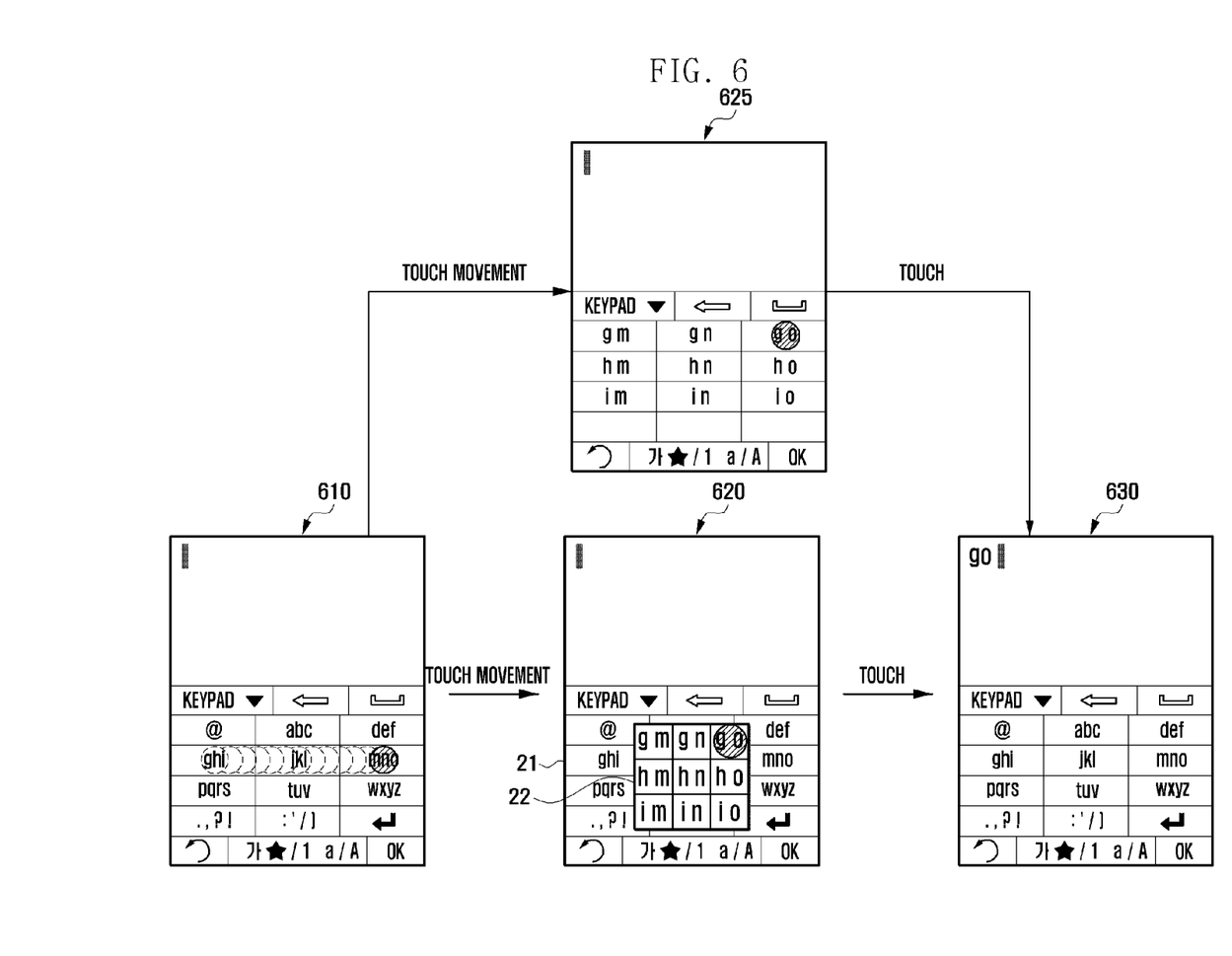
FIG. 6 is a diagram illustrating screen images showing steps of a touch movement event-based letter input procedure of the letter input method of FIG. 1 according to an exemplary embodiment of the present invention.

FIG. 2 is a flowchart illustrating a letter input method of a portable terminal according to an exemplary embodiment of the present invention, FIGS. 3 and 4 are diagrams illustrating exemplary screen images showing steps of a touch event-based letter input procedure of the letter input method of FIG. 1, FIG. 5 is a diagram illustrating screen images showing steps of a double touch event-based letter input procedure of the letter input method of FIG. 1, and FIG. 6 is a diagram illustrating screen images showing steps of a touch movement event-based letter input procedure of the letter input method of FIG. 1.

Referring to FIGS. 1 to 6, the control unit 110 first executes the text input mode at step 201. The text input mode may be, for example, an activated Short Messaging Service (SMS) message composition mode, an email composition mode, or a memo writing mode, that requires text input. In the following, the description is directed to the exemplary case of an SMS message composition mode.

If the text input mode is executed, the display unit 131 displays a text message composition screen having a virtual keypad 21 at step 203. The virtual keypad 21 is provided with a plurality of keys, and each key is assigned plural letters (e.g., 3 or 4 letters). For example, the control unit 110 can display a text message composition screen as shown in the screen image 310 of FIG. 3. The text message composition screen may include a text presentation region 10, a virtual keypad region 20, and a menu region 30. The text presentation region 10 is a region in which the text input by the user is presented along with a cursor indicating a position of the next letter. The virtual keypad region 20 is a region for presenting the virtual keypad 21. The menu region 30 is a region for presenting menu items necessary for text message composition, and can include a character set switching key (e.g., for switching among Korean, English, Number, and special symbols) and a confirmation (OK) key.

In a state where the text message composition screen is displayed, the control unit 110 monitors to detect a touch event and, if a touch event is detected, determines whether the touch event is a single touch event at step 205. If it is determined that the detected touch event is the single touch event, the control unit 110 presents an auxiliary keypad 23 presenting letters assigned to a key region to which the touch is made and allowing the user to select one of the letters in auxiliary keypad 23 at step 206. Next, the control unit 110 displays a letter selected from the auxiliary keypad 23 in the text presentation region 10 at step 207, and the procedure goes to step 219. For example, if the single touch event is detected, the control unit 110 may present the auxiliary keypad 23 in a form of a popup window such that the user can select one of the letters provided in the auxiliary keypad 23, as shown in the screen image 320. Assuming that the letter 'k' is selected from the auxiliary keypad 23, the control unit 110 displays the letter 'k' at the position of the cursor in the text presentation region 10 as shown in the screen image 330 with disappearance of the auxiliary keypad 23 and advances the cursor.

FIG. 4 shows exemplary screen images showing steps of inputting a letter using a touch input according to an exemplary embodiment of the present invention.

Referring to FIG. 4, as shown in the screen image 410, if a touch event is made to a key region assigned the letters 'j,' 'k,' and 'l,' the control unit 110 displays the first letter 'j' in the text presentation region 10. At this time, the cursor is placed below the letter 'j' to indicate that the input of the letter 'j' is not confirmed. That is, if a touch event is made to the same key region again as shown in the screen image 420, the control unit 110 replaces the previously displayed letter 'j' with the second letter assigned to the key region, 'k'. Similarly, if a touch event is made to the same key region one more time as shown in the screen image 430 of FIG. 4, the control unit 110 replaces the displayed letter 'k' with the third letter assigned to the key region, 'l', as shown in the screen image 440 of FIG. 4. If a predetermined time elapses (or a navigation key input is detected or a touch event is made at another key region) in the state where the third letter is input as shown in the screen image 440 of FIG. 4, the control unit 110 determines that the input of the displayed letter is confirmed and advances the cursor to the right side of the input letter 'l' as shown in the screen image 450. Otherwise, if a touch event is made to the same key region again before the elapse of the predetermined time in the state of the screen image 440 of FIG. 4, the control unit 110 replaces the letter 'l' with the first letter T.

In a case of using the letter input method of the related art, it is required to discriminate a double touch to be described later from a touch made for inputting the next letter sequentially (hereinafter, called sequential touch). For this purpose, the present invention sets a reference timer and determines, if the second touch is made before the elapse of the reference time after the first touch, the series of touches as the double touch and otherwise, if the second touch is made after the elapse of the reference time, the series of the touches as the sequential touch. The determination condition may be reversed. The reference time may be set to a value different from a value set for confirming the input of a letter.

If it is determined at step 205 that the detected touch event is a single touch event, the control unit 110 determines whether the detected touch event is a double touch event at step 209. If it is determined that the detected touch event is a double touch event, the control unit 110 compounds the letters assigned to a key region to which the double touch has been made into a plurality of compound letters, and displays the compound letters on the screen by means of the display unit 131 at step 211 and presents the compound letter selected by the user in the text presentation region 10 at step 217. For example, when a double touch is made to a key region assigned the letters 'j,' 'k,' and 'l' as shown in the screen image 510 of FIG. 5, the control unit 110 compounds the letters 'j,' 'k,' and 'l' into a plurality of compound letters and displays a compound keypad 22 including the compound letters in the form of a popup window on the screen as shown in the screen image 520. The compound keypad 22 may be overlaid on the virtual keypad 21. The control unit 110 also may replace the letters presented in the virtual keypad 21 with compound letters as shown in the screen image 525, rather than displaying the compound letters in the form of a popup window. At this time, the compound letters of this example presented in the compound keypad 22 or the virtual keypad 21 may include 'jj,' 'jk,' 'jl,' 'kj,' 'kk,' 'kl,' 'lj,' 'lk,' and 'll'. Assuming that a touch event is made to the key region assigned the compound letter 'll' in the state of the screen as shown in the screen image 520 or 525, the control unit 110 presents the compound letter 'll' in the text presentation region 10 as shown in the screen image 530. When the compound letter is selected on the compound keypad 22, the compound keypad 22 disappears, and when the compound letter is selected on the virtual keypad 21, the compound letters presented in the virtual keypad 21 are switched back to the original letters assigned to the corresponding key regions. As aforementioned, the letter input method according to an exemplary embodiment of the present invention is capable of inputting the same letter twice sequentially in two steps with a double touch and a single touch, enabling quick and efficient text input.

If it is determined that the detected touch event is not a double touch event, the control unit 110 determines whether the detected touch event is a touch movement event at step 213. If it is determined that the detected touch event is not the touch movement event, the procedure goes to step 219. Otherwise, if it is determined that the detected touch event is the touch movement event, the control unit 110 compounds a set of letters assigned to the key region to which the touch-down event is made and another set of letters assigned to a key region to which a touch-up event is made into a plurality of compound letters and displays the compound letters on the screen at step 215, and presents a compound letter selected by the user in the text presentation region 10 at step 217. For example, if a touch event is made with movement from a first key region assigned the letters 'g,' 'h,' and 'i' to a second key region assigned the letters 'm,' 'n,' and 'o' as shown in the screen image 610 of FIG. 6, the control unit 110 compounds the set of the letters 'g,' 'h,' and 'i' with the set of the letters 'm,' 'n,' and 'o' into compound letters and displays the compound keypad 22 having the compound letters in the form of a popup window on the screen of the display unit 131 as shown in the screen image 620 of FIG. 6. The compound keypad 22 may be overlaid on the virtual keypad 21. The control unit 110 also may replace the letters presented in the virtual keypad 21 with the compound letters as shown in the screen image 625, rather than displaying the compound letters in the form of a popup window. At this time, the compound keypad 22 or the virtual keypad 21 may present 9 compound letters of this example of 'gm,' 'gn,' 'go,' 'hm,' 'hn,' 'ho,' 'im,' 'in,' and 'io'. Assuming that a touch event is made to the key region assigned the compound letter 'go' in the state of the screen as shown in the screen image 620 or 625, the control unit 110 presents the compound letter 'go' in the text presentation region 10 as shown in the screen image 630. When the compound letter is selected on the compound keypad 22, the compound keypad 22 disappears; when the compound letter is selected on the virtual keypad 21, the compound letters presented in the virtual keypad 21 are switched back to the original letters assigned to the corresponding key regions. As aforementioned, the letter input method according to an exemplary embodiment of the present invention is capable of inputting a different letter twice sequentially in two steps with a touch movement and a single touch, enabling quick and efficient text input.

The control unit 110 monitors to detect an input for ending the text input mode at step 219. If there is no input detected for ending the text input mode, the control unit 110 returns the procedure to step 205 to repeat the aforementioned steps. Otherwise, if an input for ending the text input mode is detected, the control unit 110 controls to end the text input mode such that the text message composition screen is switched to a screen for receiving the recipient information (e.g., phone number or email address), or to the standby screen.

Although not depicted in FIGS. 2 to 6, the text input procedure based on the touch movement event also may be implemented with the multi-touch event. For example, if a multi-touch event is detected in which a second touch-down event is made to a second key region while a first touch-down event is maintained to a first key region, the control unit 110 compounds letters assigned to the key regions to which the multi-touch event is made into a plurality of compound letters and displays the compound keypad 22 comprising the compound letters on the screen of the display unit 131. At this time, the control unit 110 can control such that each compound letter starts with one of the letters assigned to the key region to which the first touch-down is made. The subsequent steps are identical to those of the touch movement event-based text input procedure.

A double touch event for compounding the letters assigned to a key region may replace another type of event. According to another exemplary embodiment of the present invention, a touch movement event (return touch movement event) in which a touch-down event and a touch-up event are made at a same key region can be replaced with an event for compounding letters assigned to the same key region. For example, if the user makes a touch-down event to a key region assigned the letters 'a,' 'b,' and 'c' and a touch-up event to the same key region after a movement, the control unit 110 compounds a set of the letters 'a,' 'b,' and 'c' with another set of the letters 'a,' 'b,' and 'c'. In another exemplary case, if the user inputs a long touch event, in which the touch-down event is maintained over a predetermined time, to a specific key region, the control unit 110 may compound two sets of the letters assigned to the key region into compound letters.

The letter input method of the portable terminal according to an exemplary embodiment of the present invention may support an automatic word completion function. This can facilitate inputting a desired word.

The description has been made of the letter input method implemented with a single touch event, a double touch event, a touch movement event, and a multi-touch event. The letter input method is described in more detail below with reference to screen images showing steps of inputting an exemplary text.

Figure 7:
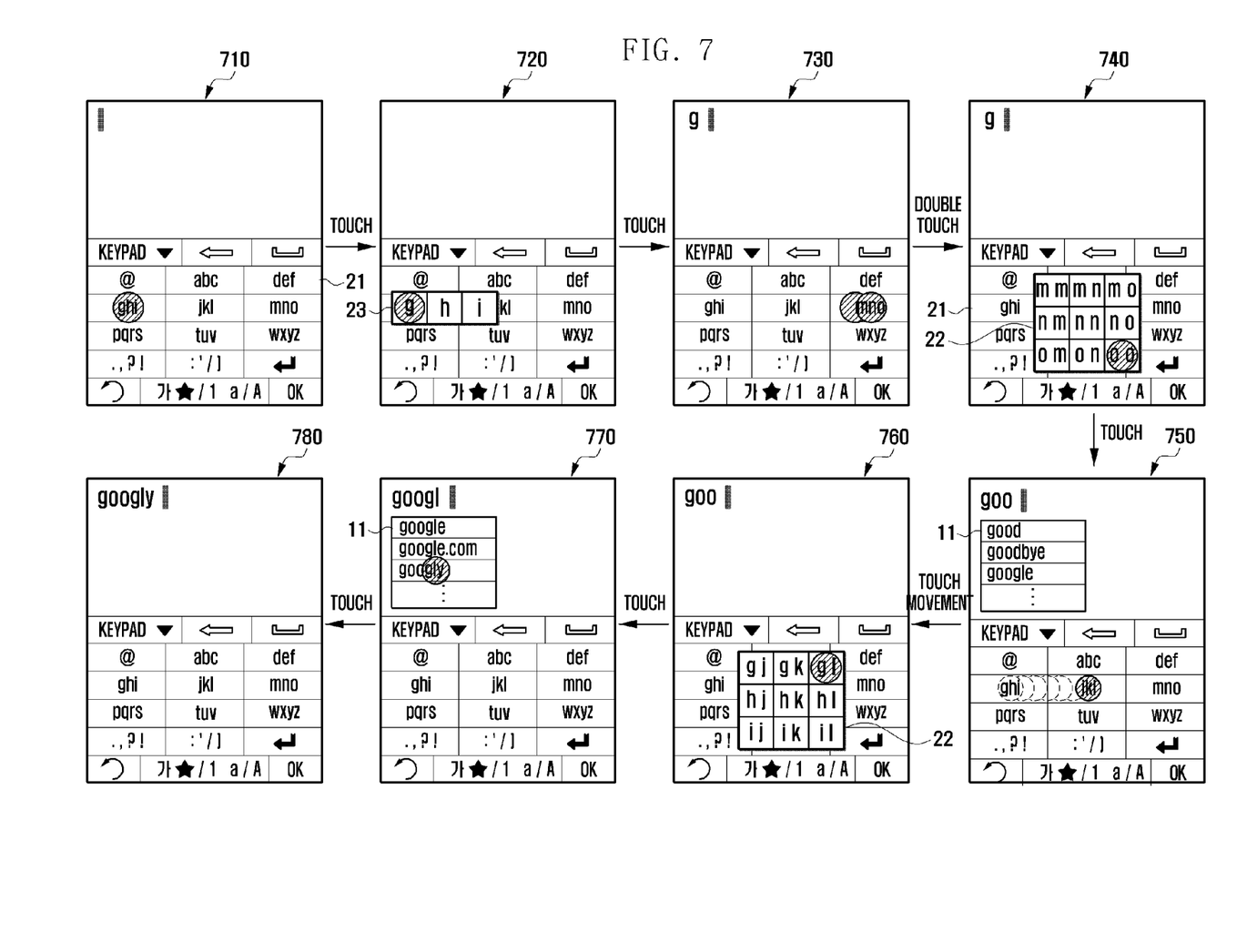
FIG. 7 is a diagram illustrating screen images showing steps of inputting an exemplary word 'googly' using a letter input method according to an exemplary embodiment of the present invention.

FIG. 7 is a diagram illustrating screen images showing steps of inputting an exemplary word 'googly' using a letter input method according to an exemplary embodiment of the present invention.

Referring to FIGS. 1 and 7, once the text input mode is executed, the display unit 131 displays a text message composition screen as shown in the screen image 710 of FIG. 7. In order to input the letter 'g', the user may input a touch event to a key region assigned the letters 'g,' 'h,' and 'i' on the virtual keypad 21. If the touch event is made to the key region assigned the letters 'g,' 'h,' and 'i', the display unit 131 displays the auxiliary keypad 23 from which the user can select one of the letters 'g,' 'h,' and 'i' as shown in the screen image 720. At this time, the auxiliary keypad 23 may be displayed in a form of a popup window overlaid on the virtual keypad 21. If a touch event is made to the key region assigned the letter 'g' on the auxiliary keypad 23, the letter 'g' is presented in the text presentation region 10 with the disappearance of the auxiliary keypad 23, as shown in the screen image 730 of FIG. 7. Next, in order to input the letters 'oo' at one time, the user may make a double touch to a key region assigned the letters 'm,' 'n,' and 'o'. If the double touch is made to the key region assigned the letters 'm,' 'n,' and 'o', the display unit 131 displays the compound keypad 22 as shown in the screen image 740 of FIG. 7. The compound key pad 22 includes the key regions assigned the compound letters obtained by compounding a set of 'm,' 'n,' and 'o' with another set of 'm,' 'n,' and 'o'. The compound keypad 22 can be displayed in the form of a popup window overlaid on the virtual keypad 21. If a touch event is made to the key region assigned the compound letter 'oo' on the compound keypad 22, the display unit 131 presents the compound letter 'oo' in the text presentation region 10 with the disappearance of the compound keypad 22 as shown in the screen image 750 of FIG. 7. In a case that the portable terminal 100 supports a word completion function, candidate words such as 'good,' 'goodbye,' and 'google' are presented below the input letters 'goo' in a candidate word window 11. In a case that the desired word exists in the list of the candidate words presented in the candidate word window 11, the user can input the desired word quickly by selecting the word from the candidate word window 11. If no candidate word exists, or if the user determines to input the desired word by himself/herself, it is possible to input the next letter or letters by making any of a single touch event, a double touch event, and a touch movement event.

If a touch movement event is made with a movement from the key region assigned the letters 'g,' 'h,' and 'i' to a key region assigned the letters 'j,' 'k,' and 'l' in the state as shown in the screen image 750, the display unit 131 displays a compound keypad 22 presenting the compound letters made up of two letters selected respectively from a set of the letters 'g,' 'h,' and 'i' and another set of the letters 'j,' 'k,' and 'l'. If the user makes a touch to a key region assigned the compound letter 'gl' on the compound keypad 22 as shown in the screen image 760, the compound letter 'gl' is presented in the text presentation region 10 as shown in the screen image 770 of FIG. 7. As aforementioned, if the word completion function is supported, the candidate words such as 'google,' 'google-.com,' and 'googly' may be presented based on the currently input letters. In this case, the user can complete the input of the desired word 'googly' by selecting the word from the list of the candidate words as shown in the screen image 770 such that the desired word is presented in the text presentation region 10 as shown in the screen image 780. In the state as shown in the screen image 770, the user also can touch a key region assigned the letters 'w,' 'x,' 'y,' and 'z' on the virtual keypad 21 and input the letter 'y' by touching a key region assigned the letter 'y' on the auxiliary keypad 23, thereby completing the input of the word 'googly' as shown in the screen image 780 of FIG. 7.

Although the word 'googly' is input in order of the steps described with reference to FIG. 7, the present invention is not limited thereto. That is, the word 'googly' can be input in various manipulation orders. For example, in order to input the word 'googly', the user can make a touch movement event for the compound letter 'go', make another touch movement event for the compound letter 'og', and make still another touch movement event for the compound letter 'ly'. Alternatively, the user can make a touch movement event for the compound letter 'go', a single touch event for the letter 'o', and another touch movement event for the compound letter 'gl', and then complete the word by inputting the letter 'y' using the word completion function. Other combinations are of course possible.

As described above, the exemplary letter input method and apparatus of a portable terminal according to the present invention is advantageous to facilitate inputting letters.

As described above, the exemplary letter input method of a portable terminal according to the present invention may be implemented in a form of program commands executable by means of various types of computers and recorded in a computer-readable storage medium. The computer-readable storage medium may store any or a combination of programs, commands, data files, and data structure. The program commands recorded in the storage medium may be designed and structured according to the present invention, but may also include ones well-known to and practiced by those skilled in the art.

The computer-readable storage medium may be any of magnetic media including hard disk, floppy disk, and magnetic tape, optical media including Compact Disc Read Only Memory (CD-ROM) and Digital Versatile Disc (DVD), magneto-Optical Media including Floptical Disk, Read Only Memory (ROM), Random Access Memory (RAM), and Flash memory, that can be configured to store the program commands. The program commands may include high-level language codes that may be executable in a computer with an interpreter as well as machine language code produced by a complier. The computer hardware device or software can be configured to operate in a form of more than one module for performing the operation of the present invention.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A text input method of a portable terminal, the method comprising:
    displaying, when a text input mode is activated, a virtual keypad including a plurality of key regions, each key region being assigned plural letters;
    compounding, when a touch movement event is detected on the virtual keypad, each of the plural letters assigned to a first key region to which a touch-down event is made with each of the plural letters assigned to a second key region to which a touch-up event is made into a plurality of new key regions, each new key region comprising a compound letter consisting of a first letter from one of the first key region and the second key region and a second letter from the other of the first key region and the second key region, wherein each compound letter of each new key region is different from the compound letters in each of the other new key regions;
    displaying the plurality of compound letters; and
    inputting, when a compound letter is selected from the displayed plurality of compound letters, the compound letter selected.

2. The method of claim 1, further comprising:
    compounding, when one of a double touch event in which a touch input event is made twice to a same key region within a predetermined period of time, a long touch event in which a touch-down event is maintained at a key region over a predetermined time, and a return touch movement event in which a touch-up event follows after movement at a same key region to which a touch-down event has occurred, letters assigned to the respective key region; and
    displaying the plurality of compound letters.

3. The method of claim 2, further comprising:
    displaying, when a touch event is detected on the virtual keypad, an auxiliary keypad comprising letters assigned to a key region to which the touch event is made; and
    inputting a letter selected from the auxiliary keypad.

4. The method of claim 2, further comprising:
inputting, when a touch event is detected on the virtual keypad, a first letter among letters assigned to a key region to which the touch event is made; and
replacing, if a touch event is detected at the key region again before a confirmation of the first letter, the first letter with a next letter.

5. The method of claim 4, further comprising discriminating the double touch event from a sequential touch event based on a predetermined reference time.

6. The method of claim 1, further comprising:
compounding, when a sequential multi-touch event in which a second touch is made to a second key region while a first touch is maintained to a first key region, letters assigned to the respective key regions into compound letters; and
displaying the plurality of compound letters.

7. The method of claim 6, wherein the compounding of the letters assigned to the key regions into the plurality of compound letters comprises creating each compound letter by placing one of the letters assigned to the key region to which the first touch is made before one of the letters assigned to the key region to which the second touch is made.

8. The method of claim 1, further comprising displaying a candidate word window comprising at least one candidate word predicted to be input based on previously input letters.

9. The method of claim 8, further comprising, when a touch event is detected in the candidate word window, inputting a candidate word to which the touch event is made.

10. The method of claim 1, wherein the displaying of the plurality of compound letters comprises at least one of:
replacing letters arranged on the virtual keypad with the plurality of compound letters; and
displaying a compound keypad comprising the plurality of compound letters in a form of a popup window.

11. A text input apparatus of a portable terminal, the apparatus comprising:
a display unit for displaying, when a text input mode is activated, a virtual keypad including a plurality of key regions, each key region being assigned plural letters;
a touch sensing unit for detecting a touch even made on the virtual keypad; and
a control unit for compounding, when a touch movement event is detected on the virtual keypad, each of the plural letters assigned to a first key region to which a touch-down event is made with each of the plural letters assigned to a second key region to which a touch-up event is made into a plurality of new key regions, each new key region comprising a compound letter consisting of a first letter from one of the first key region and the second key region and a second letter from the other of the first key region and the second key region, wherein each compound letter of each new key region is different from the compound letters in each of the other new key regions, for displaying the plurality of compound letters on the display unit, and for presenting, when a compound letter is selected from the displayed plurality of compound letters, the selected compound letter in a text presentation region.

12. The apparatus of claim 11, wherein the control unit compounds, when one of a double touch event in which a touch is made twice to a same key region within a predetermined period of time, a long touch event in which a touch-down event is maintained over a predetermined time, and a return touch movement event in which a touch-up event follows after movement at a same key region to which a touch-down event has occurred, letters assigned to the respective key region, and displays the plurality of compound letters on the display unit.

13. The apparatus of claim 12, wherein the control unit displays, when a touch event is detected on the virtual keypad, an auxiliary keypad comprising letters assigned to a key region to which the touch event is made, and inputs a letter selected from the auxiliary keypad.

14. The apparatus of claim 12, wherein the control unit inputs, when a touch event is detected on the virtual keypad, a first letter among letters assigned to a key region to which the touch event is made, and replaces, when a touch event is detected at the key region again before confirmation of the first letter, the first letter with a next letter.

15. The apparatus of claim 14, further comprising a storage unit for storing a reference time for discriminating the double touch from a sequential touch event.

16. The apparatus of claim 11, wherein the control unit compounds, when a multi-touch event on the virtual keypad is detected, letters assigned to respective key regions into the plurality of compound letters, and displays the plurality of compound letters.

17. The apparatus of claim 16, wherein the multi-touch event comprises a sequential multi-touch event in which a second touch event is made to a second key region while a first touch event is maintained to a first key region.

18. The apparatus of claim 17, wherein the control unit creates, when the sequential multi-touch is detected, each compound letter by placing one of the letters assigned to the first key region before one of the letters assigned to the second key region.

19. The apparatus of claim 11, wherein the control unit controls the display unit to display a candidate word window comprising at least one candidate word predicted to be input based on input letters.

20. The apparatus of claim 19, wherein the control unit inputs, when a touch event is detected in the candidate word window, a candidate word to which the touch event is made.

* * * * *